US007125334B2

(12) United States Patent
Yamazaki et al.

(10) Patent No.: US 7,125,334 B2
(45) Date of Patent: *Oct. 24, 2006

(54) GAME MACHINE

(75) Inventors: Shunpei Yamazaki, Tokyo (JP); Akiharu Miyanaga, Kanagawa (JP); Toshiji Hamatani, Kanagawa (JP); Norihiko Seo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 345 days.

This patent is subject to a terminal disclaimer.

(21) Appl. No.: 10/136,373

(22) Filed: May 2, 2002

(65) Prior Publication Data

US 2002/0123379 A1 Sep. 5, 2002

Related U.S. Application Data

(62) Division of application No. 09/904,886, filed on Jul. 16, 2001, now Pat. No. 6,386,976, which is a division of application No. 08/381,482, filed on Jan. 31, 1995, now Pat. No. 6,290,601, which is a division of application No. 08/143,114, filed on Oct. 29, 1993, now Pat. No. 5,421,576.

(30) Foreign Application Priority Data

Oct. 31, 1992 (JP) .............................................. 4-316042
Dec. 28, 1992 (JP) .............................................. 4-360199

(51) Int. Cl.
*A63F 13/00* (2006.01)

(52) U.S. Cl. ........................ 463/22; 273/138.1; 273/139

(58) Field of Classification Search ................... 463/20, 463/21, 22; 273/138, 138.1, 138.2, 139, 143 R
See application file for complete search history.

(56) References Cited

U.S. PATENT DOCUMENTS 4,240,635 A 12/1980 Brown (Continued)

FOREIGN PATENT DOCUMENTS

| | | | | |
|---|---|---|---|---|
| JP | 64-052493 | | 2/1989 | |
| JP | 02-104379 | | 4/1990 | |
| JP | 02-109586 | | 4/1990 | |
| JP | 02-283386 | | 11/1990 | |
| JP | 03-286789 | | 12/1991 | |
| JP | 04-022378 | | 1/1992 | |
| JP | 04-071580 | | 3/1992 | |
| JP | 04-075674 | | 3/1992 | |
| JP | 04-109721 | | 4/1992 | |
| JP | 04-300573 | | 10/1992 | |
| JP | 04-322677 | | 11/1992 | |
| JP | 04-335730 | | 11/1992 | |
| JP | 05-003951 | | 1/1993 | |
| JP | 406114150 | A * | 4/1994 | ............. 273/121 B |
| JP | 406142298 | A * | 5/1994 | ............. 273/121 B |

OTHER PUBLICATIONS

*Chaos Start, Analysis and Mathematics of Phenomena*, Baihuukan Co., Ltd, Jul. 10, 1992, pp. 1–13*

(Continued)

*Primary Examiner*—Xuan M. Thai
*Assistant Examiner*—Jeffrey C. Panos
(74) *Attorney, Agent, or Firm*—Eric J. Robinson; Robinson Intellectual Property Law Office, P.C.

(57) ABSTRACT

A game machine for providing a game, the regularity of which cannot be easily recognized by the player, by making use of a chaotic random number produced by a random number generating means.

24 Claims, 4 Drawing Sheets

U.S. PATENT DOCUMENTS

| | | | | | |
|---|---|---|---|---|---|
| 4,527,798 | A | * | 7/1985 | Siekierski et al. | 463/17 |
| 4,912,389 | A | | 3/1990 | Eguchi | |
| 4,998,199 | A | | 3/1991 | Tashiro et al. | |
| 5,004,238 | A | | 4/1991 | Okada | |
| 5,007,087 | A | | 4/1991 | Bernstein et al. | |
| 5,016,879 | A | | 5/1991 | Parker et al. | |
| 5,031,911 | A | | 7/1991 | Okada | |
| 5,048,086 | A | | 9/1991 | Bianco et al. | |
| 5,050,881 | A | * | 9/1991 | Nagao | 463/21 |
| 5,060,947 | A | | 10/1991 | Hall | |
| 5,074,559 | A | | 12/1991 | Okada | |
| 5,102,134 | A | * | 4/1992 | Smyth | 463/21 |
| 5,108,099 | A | * | 4/1992 | Smyth | 463/21 |
| 5,136,686 | A | | 8/1992 | Koza | |
| 5,239,494 | A | * | 8/1993 | Golbeck | 708/3 |
| 5,263,716 | A | * | 11/1993 | Smyth | 463/21 |
| 5,365,589 | A | * | 11/1994 | Gutowitz | 380/43 |
| 5,395,110 | A | | 3/1995 | Yamazaki et al. | |
| 5,421,576 | A | | 6/1995 | Yamazaki et al. | |
| 5,735,741 | A | | 4/1998 | Yamazaki et al. | |
| 6,290,601 | B1 | | 9/2001 | Yamazaki et al. | |
| 6,386,976 | B1 | * | 5/2002 | Yamazaki et al. | 463/22 |

OTHER PUBLICATIONS

IBM technical disclosure bulletin, Jun. 1, 1992 Software Pseudo Random Number Generator without replacement.

IBM technical disclosure bulletin, Dec. 1, 1991 Random numbers produced via a technique employing both a white noise generator and the data encryption algorithm.

Encylopedia of computer science and engineering, 1983, Random number generation, pp. 1260–1264.

* cited by examiner

GAME MACHINE

BACKGROUND OF THE INVENTION

1. Field of the Invention

The present invention relates to a game machine which can have its playing content varied on the basis of a chaos random number produced electronically by chaos random number generating means.

2. Description of Relevant Art

Generally speaking, the pachinko machines using pachinko balls are widely used, pachinko parlor businesses can be seen everywhere, and pachinko is one of the most popular amusements in Japan.

In the pachinko game, the player buys some pachinko balls and shoots them by means of a shooting handle of the machine. If one of the balls lands in a reward catcher, the player is rewarded with more balls. The shooting handle of the pachinko machine in recent years can electromechanically shoot the balls continuously, so that all that is required of the player is to turn the shooting handle. This tend to make the pachinko game monotonous. Thus, in order to make the game more interesting and to reward all players impartially a pachinko machine has been developed and put into practice which is equipped with a game machine incorporating game elements.

This pachinko machine starts the game machine, if predetermined conditions are satisfied, to determine the responses to be taken by the pachinko game so that the player can enjoy more advantageous game conditions. This type of pachinko machine is popular because players can be rewarded with more balls independently of their skills.

Thus, recent pachinko machines have been equipped with more and more CPU control units as electronics technology progresses. Specifically, the game machine incorporated in the pachinko machine is substantially operated by electronics technology, and this operation is controlled by the CPU, i.e., the so-called "microprocessor" or computer. This computer is assigned a role to compute various pieces of information from the pachinko machine itself or its game machine and to command the pachinko machine to run a predetermined operation according to a predetermined procedure (or program). However, this means mere electronic formatting of the machine, and the player can only await the decision made by the computer.

Along with pachinko machines, a rotary drum type game machine (generally called a 'slot machine' or 'pachislo') having a rotary drum type graphic pattern combining unit has recently grown popular as an amusement. The player of this drum type game machine inserts a coin into the slot and pushes a start button to turn the graphic patterns of the drum so that he or she may be rewarded with more coins according to the combination of the patterns.

This game machine is also equipped with numerous computer control units as a result of the progress of electronics technology. Specifically, the rotary drum type graphic pattern combining unit is also substantially operated by this technology, and this operation is controlled and determined by the computer or microprocessor. The role of this microprocessor is to process various pieces of information obtained from the game machine and the pattern combining unit and to give the game machine a predetermined command in accordance with a predetermined procedure (or program). This results in a monotonous play as in the pachinko machine.

The electronic pachinko machine and drum type game machine described above are extended to have more variety of play than existing game machines. After a little long game, however, the player can determine the responses to be taken by the game machine under predetermined operating situations. This is partly because the responses at the machine side are so simple as to always follow a predetermined procedure or program and partly because the random number producing means used in the computer is of such a low grade that its regularity can be grasped.

On the other hand, the player is a human being and can study the responses of the machine, i.e., the regularity of the random number before long, with the result that he or she will lose interest in the game. In this regard, game parlors are faced with the problem that they are obliged to introduce new game machines at regular intervals.

In order to overcome the disadvantages described above, it is basically sufficient to set the game machines with a computer system having means for producing fine random numbers. As fine random numbers, those generally produced by the linear congruence method or the M-series method are well-known. However, these fine random numbers are difficult for a pachinko machine which uses a relatively inexpensive CPU to produce, as compared a general purpose computer. In other words, a CPU capable of producing fine random numbers is so expensive that it cannot be employed.

Thus, a method for enabling an ordinary CPU to produce fine random numbers easily and variously is greatly desired.

SUMMARY OF THE INVENTION

In order to solve the above-specified problems, an object of the present invention is to provide a game machine for providing a game content whose regularity does not easily grasped by the player.

According to a first aspect of the present invention, there is provided a game machine for presenting a game the regularity of which cannot be easily grasped by the player, by making use of chaotic random numbers produced by random number generating means.

According to a second aspect of the present invention, there is provided a pachinko machine comprising: a plurality of reward catchers; sensor means disposed in at least one of the reward catchers for sensing the reward state of the pachinko balls; random number producing means for producing a chaotic random number; and a computer for enabling control of the reward situation of a predetermined one of the reward catchers.

According to a third aspect of the present invention, there is provided a rotary drum type game machine comprising: a rotary type indicator; random number producing means for producing a chaotic random number; and a computer for enabling control of the display of the indicator.

According to a fourth aspect of the present invention, there is provided a game machine wherein a numerical value obtained by solving a nonlinear differential equation is used as one of the conditions for determining the change in the playing content.

According to a fifth aspect of the present invention, there is provided a game machine according to the fourth aspect, wherein the solution obtained from the nonlinear equation has its regularity changed by changing the variable of the equation.

Firstly, what is meant by chaos will be described. A number of predictable phenomena are found in the both natural and artificial worlds. It is possible to predict and respond to Halley's comet or an artificial satellite. Deterministic predictability providing a clear relation between cause and effect may be one of the greatest powers of science.

However, weather forecasting is deemed the motion of the atmosphere according to physical rules, but is often false. Phenomena having an unclear connection between cause and effect is thought to have complex elements which would be accurately predictable if the complete parameters describing the system are known, that is, if sufficient information on the system can be collected.

In short, random properties are thought to arise from shortage of information on the system having multiple degrees of freedom. However, by the discovery that even a simple system having a smaller number (e.g., three or more) of degrees of freedom may exhibit random behavior, it has been found that there are some phenomena which are deterministic but essentially random. These random properties are called "chaos".

However, the concept of chaos is not yet integrated. Like the theory of evolution, the definition of chaos spreads over a wide range, and its concept seems to stand alone depending on the object. Therefore, chaos is defined as the following for the purposes of this specification.

Chaos means the phenomenon which is a system having deterministic rules but extremely complex nonlinear behavior, such that it is essentially random. Moreover, phenomena which apparently have no regularity, no predictability and an absence of order, are backed by complicated order or regularity.

Extremely fine random numbers can be produced by applying this concept of chaos to mathematics to solve a specific nonlinear equation. As an example of these random numbers, the following one-dimensional nonlinear differential equation, as expressed by mapping r from one to another section, may have an irregular and random solution called chaos:

$$X_{n+1}=r(X_n),\ n=0,\ 1, \tag{1}$$

This simple nonlinear mapping is exemplified by the Bernoulli shift, logistic mapping, tent mapping or Tshebyscheff mapping.

For example, the Bernoulli shift is expressed by the following equation:

$$r(X_n)=2X_n,\ 0\leqq X_n\leqq 1/2$$

$$r(X_n)=2X_n-1,\ 1/2\leqq X_n\leqq 1 \tag{2}$$

Logistic mapping is expressed by the following equation:

$$r(X_n)=bX_n(1-X_n) \tag{3}$$

For b=4.0 in this Equation 3, chaos is referred to as "pure chaos".

On the other hand, tent mapping is expressed by the following equation:

$$r(X_n)=X_n/\theta,\ 0\leqq X_n\leqq\theta$$

$$r(X_n)=(1-X_n)/(1-\theta),\ \theta\leqq X_n\leqq 1 \tag{4}$$

Tshebyscheff mapping is expressed by the following equation:

$$r(X_n)=\cos(n\ \cos^{-1}X_n) \tag{5}$$

The solutions of these equations are individually chaos random numbers, the regularity of which is usually unclear. Chaotic random numbers other than those mappings could be produced.

As the variable b in the logistic mapping equation is changed, for example, the solution obtainable changes within the range from 0.0 to 1.0 as the variable b approaches 4, such that it approaches more chaotic random numbers. If this variable is altered, on the other hand, the obtainable solution can be limited such that the solution converges to one for b=2 and to four for b=about 3.5. As the variable b approaches 4, that limit is reduced so that the solution takes the value of a chaotic random number within a predetermined range.

This behavior is shown in FIG. 3. FIG. 3 illustrates the value of the solution of logistic mapping, which is obtained from Equation 3 for n=300 to 500 when an initial value Xo is set at 0.3 and when the variable b is changed from 0 to 4. The value of the ordinate corresponding to the position of a black dot appearing in FIG. 3 is the value of the solution. As described above, the solution converges to one if the value b is smaller than about 3, and to two if the value b is around 3.1 to 3.4. As the value b increases, the solution increases to four, eight and so on so that the targets of convergence increase to gradually take the values of chaotic random numbers.

However, during the repetition of calculations for b=4, for example, the solution may be 0.5 after a predetermined number of repetitions dependent upon the significant digits for the operations. After this, all the solutions are 0.5. Thus, the solutions may depart from chaotic random numbers unless care is taken as to how to take the significant digits for the operations and the range of repetitions making use of the solutions.

The game machine of the present invention is constructed by making use of the chaotic random numbers thus produced by the aforementioned method. This game machine is constructed to comprise a random number producer capable of producing the aforementioned chaotic random numbers, a computer unit for issuing various instructions according to the random numbers produced by that producer, and a unit for changing the responses of the game in accordance with the instructions of the computer. Thus, the player can be kept unacquainted with the content of the game.

In case of the pachinko machine, for example, the player starts the play so that a safe ball lands in a reward catcher. The safe ball detecting means defects the safe ball and electronically produces a chaotic random number. Then, the catching states or the like of the safe ball catcher on the playing board are controlled on the basis of the electronically produced chaotic random number.

As described above, on the other hand, the solutions can be limited by changing the variable of the equation so that production of the random number can be controlled.

Specifically, the variable is incorporated into part of the playing conditions, and the solution of the aforementioned equation is determined under that condition so that the play content is modified by the solution. Thus, when the play content is modified according to the solution of the equation, the response of the game machine at the time of a specific variable and the response at the time of another variable can be made different to provide a more complicated game.

Alternatively, the solution of the equation could be other than random numbers. In order to realize conditions suitable for a beginner or advantageous for a player, the difficulty level of the game can be changed to complicate or simplify the play content by changing the variable to a predetermined value to set a state, in which the solution of the equation is liable to issue a specific numerical value, thereby setting a play content advantageous to the player.

The present invention can be applied to a pachinko machine which comprises a variable display device in which display of a symbol such as numeral, character and design and the like is renewed according to entrance of a ball into a specific prize-winning port provided on a board of the pachinko machine; means for producing a chaos random number; and a control means for controlling a renewing period of the display of the variable display device based on the chaos random number.

Also, the present invention can be applied to a pachinko machine which comprises a variable display device in which a plurality of displays of symbols such as numeral, character and design and the like are renewed according to entrance of a ball into a specific prize-winning port provided on a board of the pachinko machine; means for producing chaos random numbers plural times; and a control means for controlling renewing periods of the plurality of displays of the variable display device based on the chaos random numbers, respectively. The renewing period(s) of the variable display device is varied based on the chaos random number by a computer to make it difficult for a player to find a response of the machine.

For example, when a game ball is entered into a specific prize-winning port in play by a player, whether the entrance is big hit or failure is determined based on a signal reflecting the game ball entrance, and the display of the variable display device is determined to start renewal of the display. A time when the display is stopped is determined based on a chaos random number produced by the chaos random number production means, and the aimed display is displayed in order on the device after a set time has passed.

As described above, on the other hand, the solutions can be limited by changing the variable of the equation so that production of the random number can be controlled.

Specifically, the variable is incorporated into part of the playing conditions, and the solution of the aforementioned equation is determined under that condition to vary the renewing period according to the solution. Thus, when the renewing period is varied according to the solution of the equation, the response of the game machine at the time of a specific variable and the response at the time of another variable can be made different to provide a more complicated game.

DESCRIPTION OF THE PREFERRED EMBODIMENTS

Embodiment 1

Figure 1:
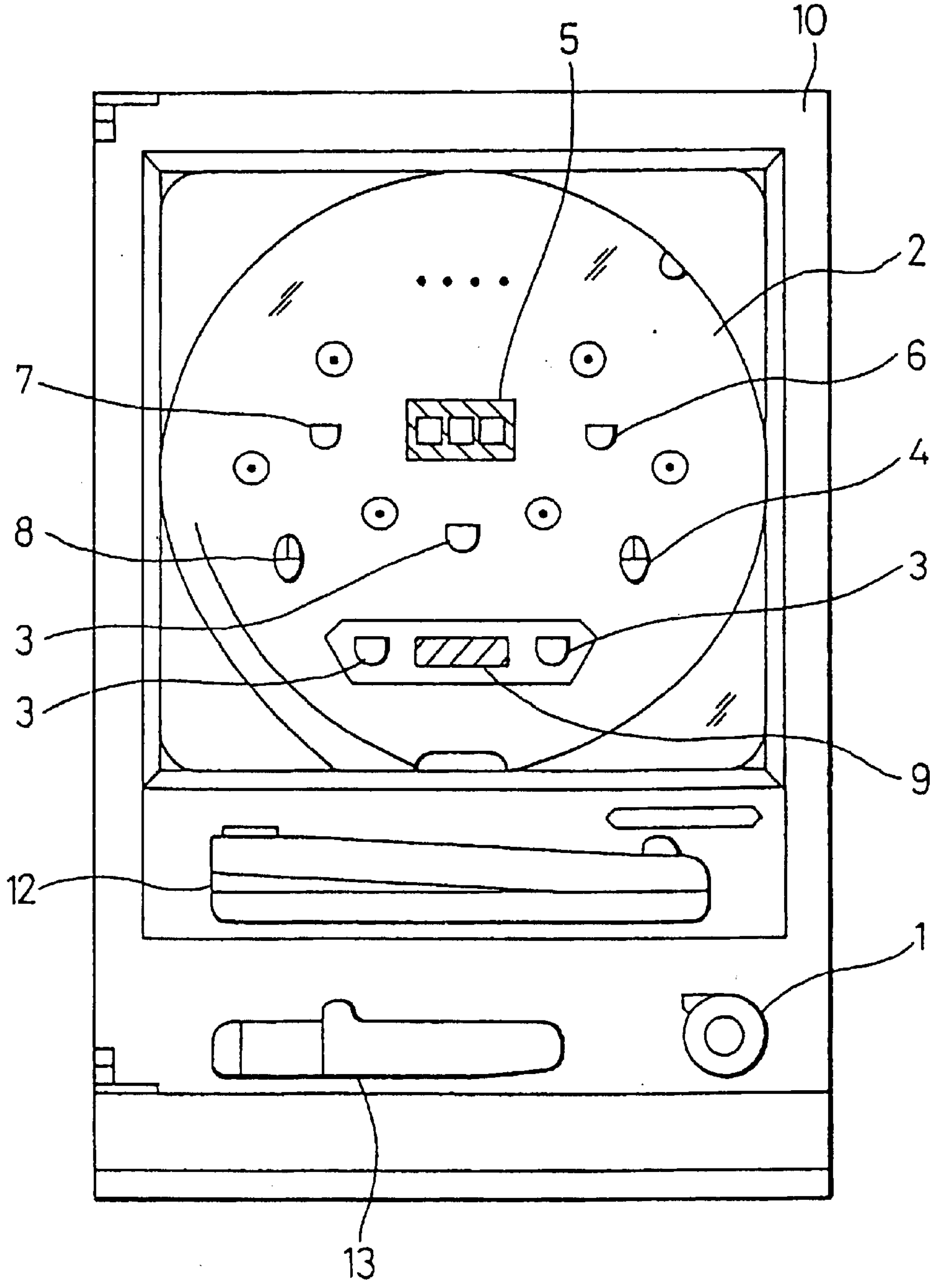
FIG. 1 is a schematic top plan view showing a pachinko machine according to the present invention.

The present embodiment will be described in a case where the present invention is applied to a "pachinko" machine. This embodiment will be described with reference to the accompanying drawings. FIG. 1 shows a playing board front face of the pachinko machine.

Reference numeral 1 designates a ball shooting handle, and numeral 2 designates a playing board face 2, which is equipped with reward catchers 4, 6, 7 and 8, a game indicator 5 of the game unit, a reward catcher 3 having functions to start the gate unit, and a great-hit catcher 9. The pachinko balls shot by the shooting machine are bounced in various directions to fly downward over the board face 2 via nails arranged in the board face 2.

When the pachinko ball lands in any of the reward catchers 3, 4, 6, 7 and 8, reward balls are supplied to a ball feed/reserve chute 12. In particular, when a ball lands in the rewarding catcher 3, the game unit is started in addition to the supply of reward balls. This game unit changes indications of three figures in the game indicator 5 and interrupts the changes after lapse of a predetermined time period. The game unit commands the opening of a control valve for the great-hit catcher 9 if a predetermined combination of figures is achieved at the interruption. If this special condition is attained, the great hit causes the pachinko machine to open the great-hit catcher 9 thereby establishing a state in which the player receives more pachinko balls.

Now, a pachinko ball shot by the ball shooting handle 1 drops over the board face and lands in one of the reward catchers 3. Then, this is detected by a sensor disposed in that catcher 3 so that it is converted into an electric signal and fed to the computer. In response to this signal, the computer actuates the game indicator 5 to produce a display according to the chaotic random number which is produced by the chaotic random number generating means.

In the present embodiment, the chaotic random number used is exemplified by the solution of the following Equation 6 using logistic mapping for a nonlinear differential equation:

$$X_{n+1}=4X_n(1-X_n) \tag{6}$$

For n=301, 302, 303, 304 and 305, for example, the solutions of Equation 6 to be enumerated are "0.8721", "0.4462", "0.9884", "0.0458" and "0.1747". In this case, the initial value is set at 0.1, and the variable is set at 4.0000.

If this chaotic random number satisfies a predetermined condition, the control valve of the great-hit catcher 9 on the playing board is opened or closed according to an instruction from the computer. These opening/closing operations of the valve are different depending upon the random number. According to this random number, reward conditions such as the interval or extent of the control valve are determined by the computer so that the opening/closing operations are changed.

Figure 2:
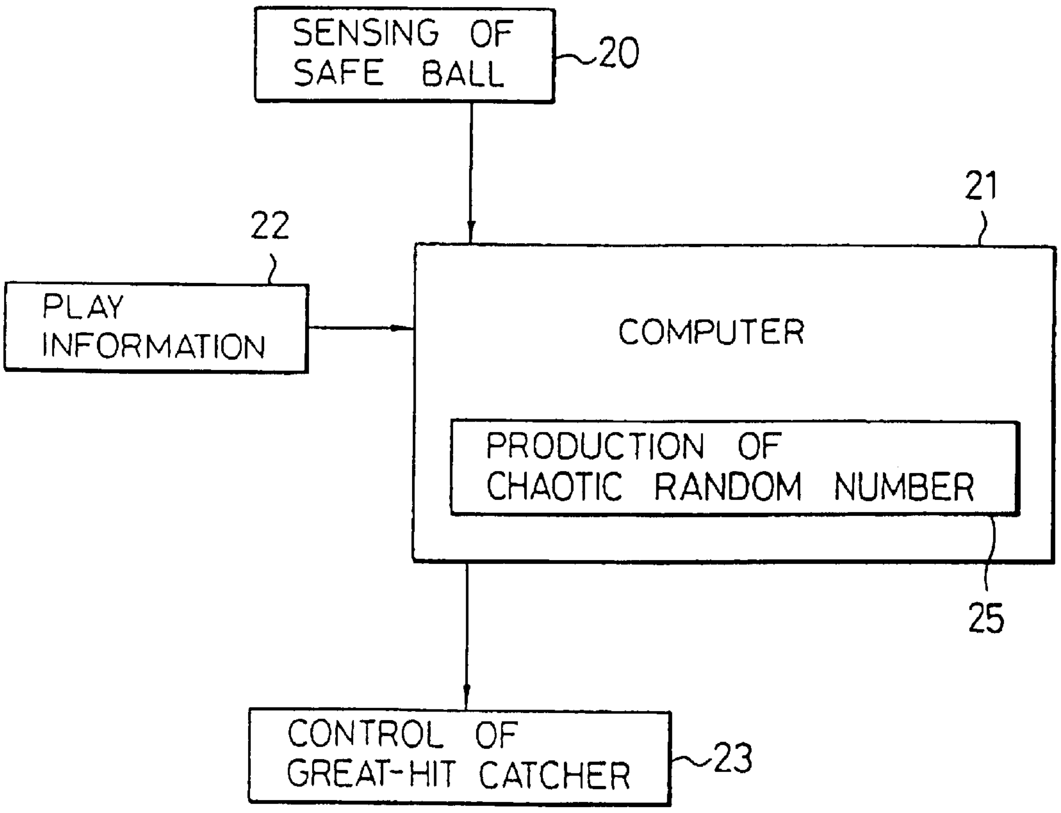
FIG. 2 is a block diagram illustrating the present invention.
Figure 3:
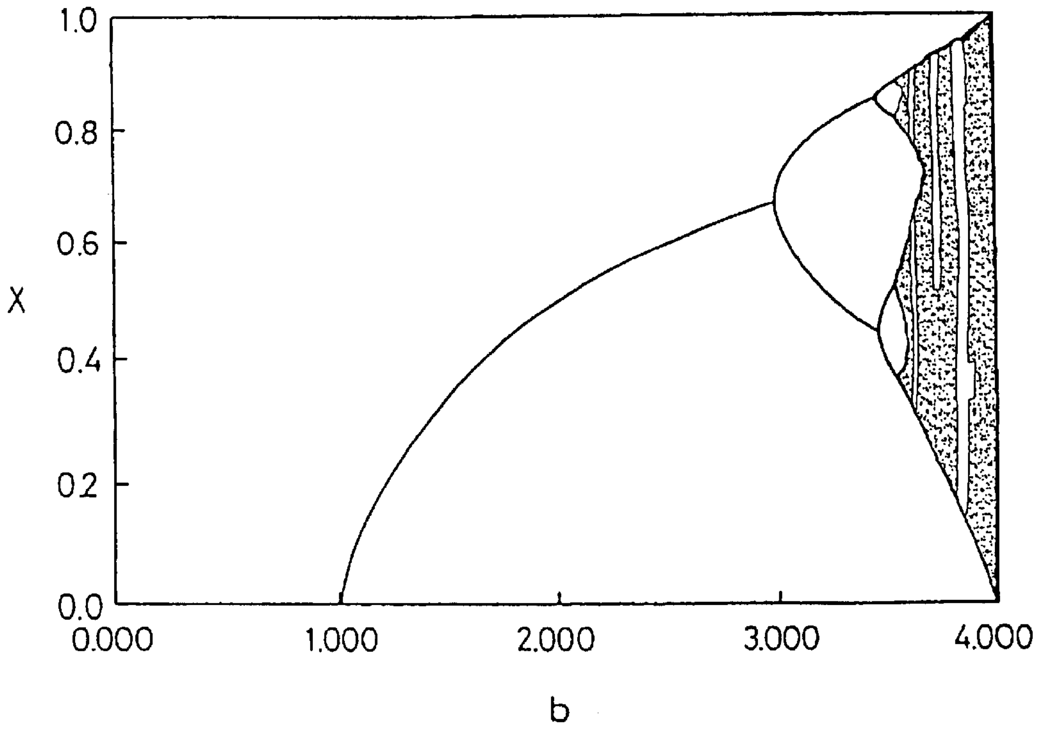
FIG. 3 is a graph plotting the dependency of the solution of the logistic mapping upon the variable.

FIG. 2 is a block diagram showing a pachinko machine equipped with this computer. A safe ball in the reward catcher is sensed, as indicated by 20, by the sensor. In response to a signal from this sensor, a computer 21 produces, as represented by 25, a chaotic random number for controlling the great-hit catcher, as indicated by 23. Play information 22 is so interlocked with the computer by another sensor means that it can be combined with the sensing of the safe ball 20 to provide a more complex playing content.

Embodiment 2

The present embodiment will be described in relation to a rotary drum type game machine.

The game is started when the player inserts a coin or pushes a start button. Then, a gate start signal is supplied to the computer. In this computer, a chaotic random number is produced by a random generating unit disposed in or connected to the computer.

In accordance with the random number thus produced, the rotary drum type indicator is displayed so that coins of a predetermined multiple of the inserted coin are returned according to the combination of the display.

By using the chaotic random number, as in the present embodiment, all the players can be paid back with reward coins at a fair rate of probability while being kept unacquainted with the regularity at which the random number is produced.

Embodiment 3

The present embodiment will be described in relation to a pachinko machine similar to that of Embodiment 1, in which the production of numerical values to be used in the play is changed depending upon the playing condition.

The structure of the game machine used is substantially the same as that of Embodiment 1. Here, means for counting the number of rewards is connected with the sensor for sensing the catch of the safe ball by the reward catcher 3 to start the game so that the reward number may be fed as a signal to the computer. Alternatively, this reward number counting means may be disposed in the computer.

Now, a pachinko ball shot by the ball shooting handle 1 drops over the board face and lands in one of the reward catchers 3. Then, this reward is detected by a sensor disposed in that catcher 3 so that it is converted into an electrical signal and fed to the computer. In response to this signal, the computer actuates the game indicator 5 to make a display according to the chaotic random number which is produced by the chaotic random number generating means.

In the present embodiment, the chaotic random number used is exemplified by the solution of the following Equation 6 using logistic mapping for a nonlinear differential equation:

$$X_{n+1}=4X_n(1-X_n) \tag{6}$$

In this case, the initial value is set at 0.1, and the variable is set at 4.

If this chaotic random number satisfies a predetermined condition, the control valve of the great-hit catcher 9 on the playing board is opened or closed according to an instruction from the computer, to establish the so-called “great hit”. If ten rewards of the reward catcher 3 continue while failing to satisfy the condition, the computer changes the value of the variable b and sets the condition to give a regularity to the production of the random number so as to limit the numerical value to be produced.

For a variable b of 3.50, for example, the solution of the equation, which is obtained when a safe ball lands in the reward catcher 3 the next time, converges to eight values if 100 or more repetitions are reached. If any of these eight values is set for the great-hit condition, the probability of a great hit rises to one eighth. If the great-hit condition is not satisfied under that condition even after five rewards, for example, the value of the variable is returned to about 4 to restore the state of the chaotic random number. In this way, the numerical value to be obtained by solving the equation is controlled so that the change to a more advantageous situation or the return to the initial state can be realized by changing the simple variable in a case where the player is in a disadvantageous situation. Thus, it is easy to expand the number of variations of the playing content.

Embodiment 4

FIG. 1 shows a panel face on the front surface of a pinball machine (pachinko machine). The panel face includes a pinball shooting handle 1, and a game panel 2. The game panel 2 is provided thereon with prize-winning ports 4, 6, 7 and 8, a display panel 5 for a game equipment, a prize-winning port 3 having a game-equipment starting, chucker function, and a big prize-winning port 9. Pinballs which are shot from a shooting device are bounded in various directions by nails provided on the game panel while moved downwardly on the game panel 2. At this time, when any pinball enters any one of the prize-winning ports 3, 4, 6, 7 and 8, prize-pinballs are given (repaid) onto a pinball reception pan 12 of a player. Particularly, when any pinball enters the prize-winning port 3, the game equipment is started in addition to the repayment of the prize-pinballs. This game equipment serves to vary a three-digit display (laterally-arranged three symbols) on a variable display unit 5, and stop the variation of the display after a predetermined time elapses. If these three symbols are set to a specific combination, an instruction for carrying out an opening/closing operation of an open/close valve of the big prize-winning port 9 is output from the game equipment. Through this operation, the pinball machine opens the open/close valve of the big prize-winning port 9 so that the player can easily gain the prize-pinballs.

Now, assuming that the pinballs shot from the shooting device 1 fall down on the game panel and enter the prize-winning port 3, the prize-winning is detected by a sensor which is provided to the prize-winning port 3, and this fact is converted to an electrical signal. The electrical signal is thereafter output to a computer. On the basis of the electrical signal thus transmitted, the computer makes a judgment on a big hit or a failing, and then carries out subsequent controls. In this embodiment, it is needless to say that it is effective to exclude regularity for the judgment on the big hit or the failing using random numbers.

Through the above judgment, any one of the big hit and the failing is determined, and a display content which is suitable for each case is determined on the variable display device.

The display content to be displayed on the three display units of the variable display device is any one of 3375 (15×15×15) combinations each of which comprises three characters selected from nine numerals (1 to 9) and six alphabets (A, B, C, D, E, F). The big hit corresponds to each of 15 combinations in which the display contents at the three display units are coincident with one another, and the failing corresponds to each of 3360 combinations in which the display content at at least one of the three display units is different from those at the other display units. Any one of these combinations (display content) is selected by the control means.

Each of the display contents of the three display units continues to be varied (renewed) for a renewing period (time) until the display content of each display unit which is determined by the control means is finally displayed, and the renewing period for each display unit is determined on the basis of each of chaos random numbers produced by a chaos random number generating means. In this embodiment, three chaos random numbers are calculated by carrying out a calculation three times, and a stop time for stopping the variation (renewing) of each display unit is determined on the basis of each of the calculated chaos random numbers.

In this embodiment, the variations of the three display contents of the left, middle and right display units are successively stopped in this order. The variation (renewing) of the display content is simultaneously started for the three display units. A time for stopping the variation (renewing) of the display content of the left display unit (hereinafter referred to as “a left stop time”) is selected from five lapse times at one-second interval which range from one-second lapse to five-seconds lapse after the display content of the left display unit starts its variation, that is, the left stop time corresponds to a time just when one second, two seconds, three seconds, four seconds or five seconds elapse from the start of the variation of the display content of the left display unit. A time for stopping the variation (renewing) of the display content of the middle display unit (hereinafter referred to as “middle stop time”) is selected from five lapse times at one-second interval which range from one-second lapse to five-seconds lapse after the variation of the display content of the left display unit is stopped, that is, the middle stop time corresponds to a time just when one second, two seconds, three seconds, four seconds or five seconds elapse from the stop of the variation of the display content of the left display unit. Likewise, a time for stopping the variation (renewing) of the display content of the right display unit (hereinafter referred to as “right stop time”) is selected from five lapse times at one-second interval which range from one-second lapse to five-seconds lapse after the variation of the display content of the middle display unit is stopped, that is, the right stop time corresponds to a time just when one second, two seconds, three seconds, four seconds or five seconds elapse from the stop of the variation of the display content of the middle display unit. These stop times are selected on the basis of the calculated chaos random numbers. Totally, 125 combinations are provided as a combination of the left, middle and right stop times. It takes 15 seconds at longest and 3 seconds at shortest from the start of the variation (renewing) of the display contents till the stop of the variation of the display content of the right display unit.

In this embodiment, solutions of the following equation (6) in which a logistic mapping is used for a non-linear difference equation are used as chaos random numbers:

$$X_{n+1}=4X_n(1-X_n) \tag{6}$$

In this case, an initial value is set to 0.1 and a parameter is set to 4.0000.

With the above settings, the chaos random number is produced in a range from 0.000 to 1.000. Accordingly, 125 levels which are obtained by dividing the range of 0.000 to 1.000 at an interval of 0.008 are beforehand specified, and each of the combinations of the respective display renewing stop periods corresponds to each of 125 levels. The produced chaos random numbers are allocated to the above 125 levels, and the renewing is stopped in accordance with the corresponding combination.

Figure 4:
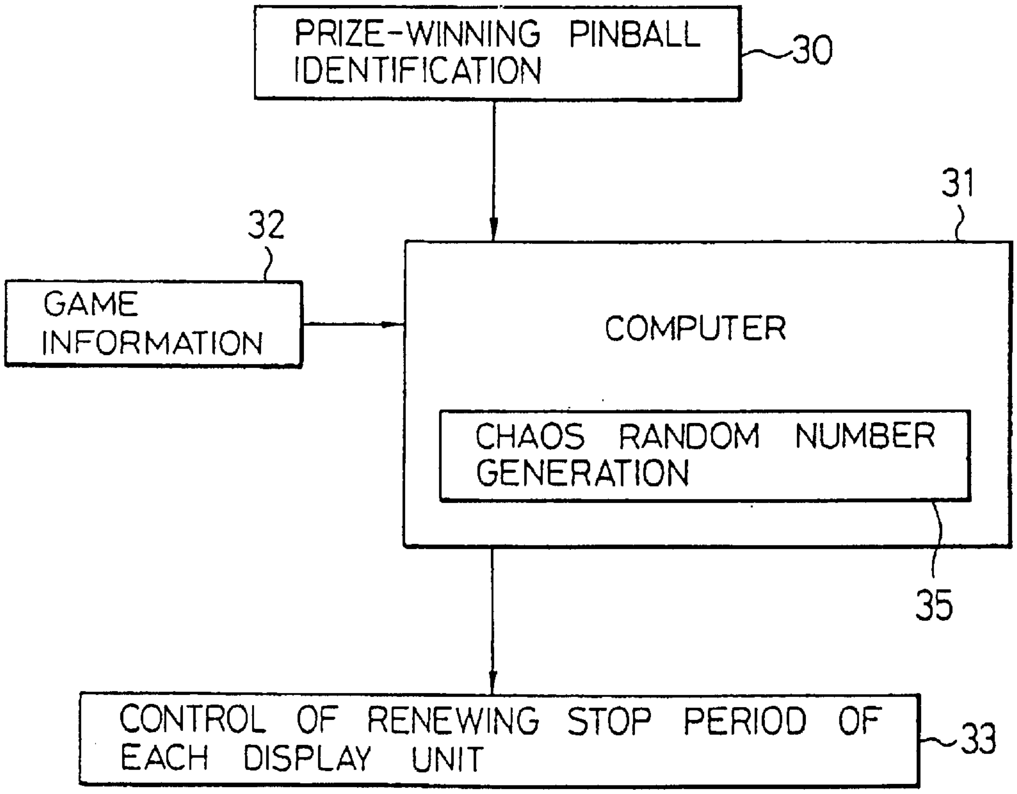
FIG. 4 is a block diagram illustrating the present invention.

FIG. 4 is a block diagram of a pinball machine equipped with a computer according to this embodiment. A prize-winning pinball is identified at the prize-winning port by the sensor (prize-winning pinball identification 30), and the computer 31 receives a signal from the prize-winning identification 30 to produce a chaos random number (chaos random number generation 35). The renewing stop period for each display unit is controlled on the basis of the chaos random number. In addition, a more complicated game content may be performed by linking a game information 32 to the computer through another sensor means, and interlocking this information with the identification of the prize-winning pinball.

Embodiment 5

In the embodiment 4, the order of stopping the variation (renewing) of the display contents of the display units is fixed in the variable display device. However, in this embodiment, the order of stopping the variation of the display contents is also determined using chaos random numbers. Further, in this embodiment, each of the left, middle and right stop times, that is, a period from the start of the variation of the display content till the stop of the variation is selected from 13 lapse times at one-second interval which range from 3-seconds lapse to 15-second lapses at one-second interval (i.e., corresponds to a time just when three seconds, four seconds, . . . , or 15 seconds elapse after the variation of the display content of each display unit is started).

Like the embodiment 4, the used chaos random numbers are produced using the equation (6) wherein the initial value is set to 0.1 and the parameter is set to 4.0000).

In this embodiment, the chaos random number occurring range from 0.000 to 1.000 is divided to 13 regions, and each of the regions corresponds to each of the display stop periods of 3-seconds to 15-seconds.

When the display content to be displayed on the variable display device is identified through the prize-winning at the prize-winning port 3, three chaos random numbers are sequentially produced by the chaos generating means. The produced chaos random numbers correspond to the left, middle and right display units of the variable display device. The random numbers are allocated to the 13 regions, and then the period of each display unit from the start of the renewing till the stop of the renewing is determined. The display contents of the respective display units are simultaneously started to be renewed, and the renewing of each display content is stopped in accordance with each set value.

For example, in a case where the renewing stop periods for the left, middle and right display units are determined as 7 seconds, 4 seconds and 12 seconds after the renewing is started, respectively, just after 4 seconds elapse from the start of the renewing, the variation of the display content of the middle display unit is stopped, and the variation of the display content of the left display unit is stopped just after 3 seconds elapse from the stop of the variation of the middle display unit. Further, the variation of the display content of the right display unit is stopped just after 5 seconds elapses from the stop of the left display unit (just after 12 seconds elapse from the start of the renewing). In this state, all of the display contents are displayed on the variable display device.

In the above embodiment, the chaos random numbers are calculated by executing a program in the computer. However, the chaos random numbers may be obtained using an exclusively-used integrated circuit or the like.

In this invention, it is effective to provide a means of intentionally or automatically altering the initial value of the non-linear equation which is used to produce the chaos random numbers.

Although the description thus far made is directed to pachinko machines and rotary drum type game machines, the present invention should not be limited thereto but can be applied to all game machines if a random number or a simple but irregular numerical value is employed.

According to this invention, a pinball machine (a pachinko machine) in which a player hardly feels regularity of a game device can be provided using a cheap and simple CPU.

Moreover, the numeral value necessary for play can be obtained merely by solving a relatively simple nonlinear equation, the solution of which can also be obtained by changing the variable from a chaotic random number to a binary value or a unity (univocal value). Thus, various numerical values can be easily achieved according to the play content.

What is claimed is:

1. A game machine comprising;

a computer; and a random generating unit disposed in said computer for generating a random number, wherein difficulty level of a game conducted in said game machine is changed by changing regularity of said random number, and wherein said regularity of said random number is changed depending upon a playing condition of said game conducted in said game machine.

2. A machine acording to claim 1 wherein said game machine is a pachinko machine or a slot machine.

3. A machine according to claim 1 wherein said random generating unit generates said random number a plurality of times.

4. A machine according to claim 1 wherein a variable of a nonlinear equation is changed depending upon the playing condition of said game conducted in said game machine, and said plurality of said random number is changed depending upon said variable of said nonlinear equation.

5. A machine according to claim 4 wherein said nonlinear equation is a logistic mapping.

6. A machine according to claim 4 wherein said nonlinear equation is a one- dimensional nonlinear differential equation.

7. A game machine comprising:

a computer; and a random generating unit connected with said computer for generating a random number, wherein difficulty level of a game conducted in said game machine is changed by changing regularly of said random number, and wherein said regularly of said random number is changed depending upon a playing condition of said game conducted in said game machine.

8. A machine according to claim 7 wherein said game machine is a pachinko machne or a slot machine.

9. A machine according to claim 7 wherein said random generating unit generates said random number a plurality of times.

10. A machine according to claim 7 wherein a variable of a nonlinear equation is changed depending upon the playing condition of said game conducted in said game machine, and said regularly of said random number is changed depending upon said variable of said nonlinear equation.

11. A machine according to claim 10 wherein said nonlinear equation is a logistic mapping.

12. A machine according to claim 10 wherein said nonlinear equation is a one- dimensional nonlinear differential equation.

13. A game machine comprising:

a computer; and an integrated circuit disposed in said computer for generating a random number, wherein difficulty level of a game conducted in said game machine is changed by changing regularity of said random number, and wherein said regularlity of said random number is changed depending upon a playing condition of said game conducted in said game machine.

14. A machine according to claim 13 wherein said game machine is a pachinko machine or a slot machine.

15. A machine according to claim 13 wherein said integrated circuit generated said random number a plurality of times.

16. A machine according to claim 13 wherein a variable of a nonlinear equation is changed depending upon the playing condition of said game conducted in said game machine, and said regularly of said random number is changed depending upon said variable of said nonlinear equation.

17. A machine according to claim 16 wherein said nonlinear equation is a logistic mapping.

18. A machine according to claim 16 wherein said nonlinear equation is a one- dimensional nonlinear differential equation.

19. A game machine comprising:

a computer; and an integrated circuit connected with said omputer for generating a random number, wherein difficulty level of a game conducted in said game machine is changed by changing regularly of said random number, and wherein said regularly of said random number is changed depending upon a playing condition of said game conducted in said game machine.

20. A machine according to claim 19 wherein said game machine is a pachinko machine or a slot machine.

21. A machine according to claim 19 wherein said integrated circuit generates said random number a plurality of times.

22. A machine according to claim 19 wherein a variable of a nonlinear equation is changed depending upon the playing condition of said game conducted in said game machine, and said regularity of said random number is changed depending upon said variable of said nonlinear equation.

23. A machine according to claim 22 wherein said nonlinear equation is a logistic mapping.

24. A machine according to claim 22 wherein said nonlinear equation is a one-dimensional nonlinear differential equation.

* * * * *